Figure 1:
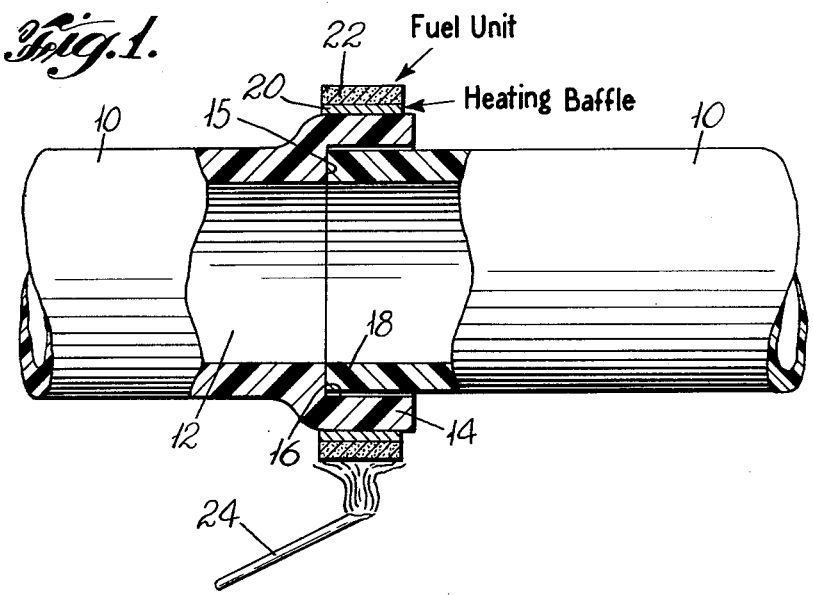

Aug. 28, 1962     P. WILTON ETAL     3,051,509

FUSED BELL PLASTIC PIPE JOINT

Filed Feb. 18, 1959

INVENTORS
PETER WILTON
FRANKLIN D. MARROW

BY Richard S. Shreve, Jr.
ATTORNEY

United States Patent Office 3,051,509
Patented Aug. 28, 1962

3,051,509
FUSED BELL PLASTIC PIPE JOINT
Peter Wilton, Plainfield, and Franklin D. Marrow, Middlesex, N.J., assignors to Union Carbide Corporation, a corporation of New York
Filed Feb. 18, 1959, Ser. No. 794,154
8 Claims. (Cl. 285—21)

This invention relates to fused bell plastic pipe joints, and more particularly to expedients for joining bell ended pipe sections and fittings in aligned telescoping end relation to form fluid-tight connections.

Our copending application Serial No. 644,763, filed March 8, 1957, relates to the joining of thermoplastic pipe by means of a thin thermoplastic sleeve which is fused to the pipe by the heat generated by an encircling layer of a chemical fuel patch, which can be ignited with a match.

The main object of the present invention is to avoid the addition of thermoplastic material and effect the joining of the pipe by fusing of its own material.

According to the present invention the open plain end of plastic pipe is inserted into an open bell, the bell is encircled with a heat conductive sleeve covered on the outside with a layer of chemical patch, and the patch is ignited to fuse the outer surface of the open plain end to the inner surface of the bell, while maintaining their hollow unobstructed interiors.

Figure 2:
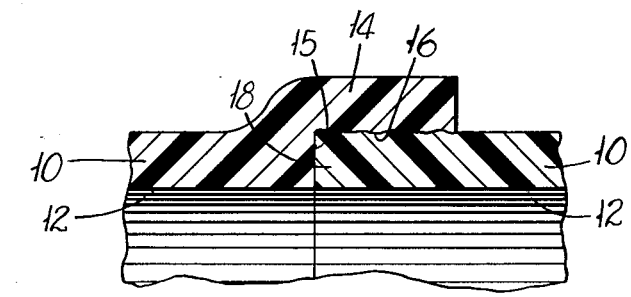

In the drawings:

FIGURE 1 is a side elevation, with parts broken away and shown in section, of a plastic pipe joint assembled for fusing according to the preferred embodiment of the present invention; and FIGURE 2 is an enlarged fragmentary detail of a portion of the fused plastic pipe joint.

The hollow plastic pipe end portion shown is of uniform wall thickness constructed of plastic material and having a smooth straight cylindrical surface 10 of constant diameter, and an unobstructed hollow cylindrical passage 12 continuous throughout its length with a constant inner diameter. The open bell 14 has a radial annular shoulder 15 therein and a cylindrical inner surface 16 adapted to snugly receive an open plain end 18.

The open plain end 18 is inserted into the open bell 14 into abutting relation and placed in plastic contact with the radial annular shoulder 15 of substantially the same inside and outside diameter, with their hollow interiors in alignment, and the cylindrical outer surface of the open plain end 18 in plastic to plastic contact with the cylindrical inner surface 16 of the bell, with a snug but not tight fit.

The bell 14 is encircled by a heat conductive metal sleeve 20 preferably copper, which acts to distribute the heat and accommodate the heating unit. This baffle is coated on the outside with a layer of a substance 22 capable of emitting heat when consumed by slowly propagating low ignition.

The substance 22 is ignited by a match 24 to transfer heat of combustion of the material 22 through the sleeve 20 and the bell 14 to the open plain end 18 to fuse the cylindrical inner surface 16 to the cylindrical outer surface of the plain end 18 while leaving the passage 12 unobstructed.

The pipe and bell fitting are preferably of polyethylenic or polyvinyl chloride resin compositions; but may be of other fusible, thermoplastic compositions such as are formulated with cellulose acetate, butyrate, polyamides, homopolymers or copolymers of olefinically unsaturated monomers such as vinyl chloride, vinyl acetate, vinylidene chloride, styrene, acrylonitrile, acrylic acids, esters or amides, etc., or other fusible, thermoplastic resins and mixtures thereof.

It is generally preferred that the bell fitting and pipe ends to be jointed therewith be of substantially the same composition, since this generally provides the strongest joint and yields an overall conduit system of substantially uniform chemical resistance.

The combustible material (or fuel) is of the readily inflammable type which can be ignited by an ordinary match, examples of which material are disclosed in U.S. Patents 1,970,698 and 2,070,428.

The heat baffle and fuel can be manufactured as a complete self-contained unit ready for use, e.g., a cylinder.

The strength of joints made by the method of this invention is generally comparable to that of the pipe itself. For instance, commercial ½" polyethylene pipe having a recommended working pressure of 100 p.s.i. was subjected to instantaneous burst tests. Failure occurred at pressures of 450–500 p.s.i. When fresh sections of this same pipe were jointed by the instant method then subjected to similar tests, leakage occurred at the joints at pressures ranging from 375 to 450 p.s.i., which pressures are well above the pipe's recommended working pressure (100 p.s.i.) and comparable to that of the bursting strength of the pipe itself.

The preferred bell wall thickness depends on, among other things, the composition and construction of the fitting and pipe, e.g., the particular thermoplastic resin(s) involved, their thermal conductivity characteristics, the presence or absence of reinforcing layers and the nature of same, the degree of strain therein (which tends to deform the pipe and/or fitting as they are heated), the diameter and wall thickness of the pipe, etc. Most commercial thermoplastic bell fittings have about ⅛–5/32" thick wall at the bell section. In most cases, so thick a bell wall impedes proper transfer of heat from the fuel unit to the pipe wall and results in poor bonding. In some such instances, satisfactory bonding can be achieved with higher fusion temperatures; but this expedient sometimes causes deformation of the pipe and joint assembly. On the other hand, too thin a bell wall leads to less than optimum strength. Thus, all things considered, a bell wall thickness of about 0.05–0.1 inch, particularly about 0.075–0.1 inch, is generally preferred for polyethylene resin compositions; but as previously indicated, other thicknesses may be used depending on the size and nature of the particular pipe and fitting involved.

What is claimed is:

1. Method of joining an open bell to an open plain end of organic resin plastic pipe conduit, said open bell having an internal annular shoulder and an inner surface adapted to snugly receive said open plain end, which comprises inserting said open plain end into said open bell into abutting relation with said internal annular shoulder with their hollow interiors in alignment and the outer organic resin surface of said open plain end in plastic to plastic contact with the inner organic resin surface of said open bell, encircling said bell with a heat conductive sleeve on the outside with a layer of a substance capable of emitting heat when consumed by slowly propagating low ignition, and igniting said substance to transfer heat through said sleeve and open bell into said open plain end to fuse said inner organic resin surface of said open bell to the contacting outer organic resin surface of said open plain end, while maintaining a through passage from the hollow interior of said open plain end through said annular shoulder to the hollow interior of said open bell.

2. Method of joining an open bell to an open plain end of hollow plastic pipe conduit having a uniform wall thickness constructed throughout only of non-metallic material and having a smooth straight cylindrical outer plastic surface of constant diameter and an unobstructed hollow cylindrical passage with a constant inner diameter, said open bell having a radial annular shoulder therein and a cylindrical inner surface of larger diameter than said hollow passage and adapted to snugly receive said open plain end, which comprises inserting said open plain end into said open bell into abutting relation with said radial annular shoulder with their hollow interiors in alignment and the cylindrical outer surface of said open plain end in plastic to plastic contact with the cylindrical inner surface of said open bell, encircling the cylindrical outer surface of said open bell in plastic to metal contact with a heat conductive metal sleeve covered on the outside with a layer of a substance capable of emitting heat when consumed by slowly propagating low ignition, and igniting said substance to transfer heat through said sleeve and open bell into said open plain end, to fuse said inner cylindrical surface of said open bell to the contacting cylindrical outer surface of said open plain end, while maintaining a through passage from the hollow interior of said open plain end through said radial annular shoulder to the hollow interior of said open bell.

3. Method as claimed in claim 1 in which the open bell and plain end are of polyethylene.

4. Method as claimed in claim 1 in which the open bell and plain end are of polyvinyl chloride.

5. Means for joining hollow plastic pipe conduits comprising a hollow plastic pipe conduit increased in radius at an end portion thereof to form a bell having an outer surface, an internal annular shoulder and an inner surface adapted to snugly receive an inserted section of hollow plastic pipe conduit in abutting relation with said internal annular shoulder and in plastic-to-plastic contact with said inner surface with the hollow interiors of said plastic pipe conduits in alignment, a heat conductive sleeve encircling said bell and said outer surface of said bell, and a layer of a substance capable of emitting heat when consumed by slowly propagating low ignition, whereby ignition of said substance transfers heat through said heat conductive sleeve to fuse said bell to said inserted hollow plastic pipe conduit at the plastic-to-plastic contact thereof.

6. In a hollow plastic pipe conduit connection the combination including
 (a) a pair of hollow plastic pipe conduits
 (b) one of said pair of conduits being increased in radius at an end portion thereof to form a bell having an outer surface, an internal annular shoulder and an inner surface
 (c) the other of said pair of conduits in abutting relation with said internal annular shoulder and in plastic-to-plastic contact with said inner surface
 (d) a heat conductive sleeve encircling the outer surface of said bell
 (e) a layer of a substance capable of emitting heat when consumed by slowly propagating low ignition on said heat conductive sleeve on said outer surface of said bell
 (f) whereby ignition of said substance transfers heat through said heat conductive sleeve to fuse said bell to said inserted hollow plastic pipe conduit at the plastic-to-plastic contact thereof.

7. The combination claimed in claim 6 wherein said pair of holow plastic pipe conduits are of polyethylene.

8. The combination claimed in claim 6 wherein said pair of hollow plastic pipe conduits are of polyvinyl chloride.

References Cited in the file of this patent

UNITED STATES PATENTS

| | | |
|---|---|---|
| 934,711 | Chapman | Sept. 21, 1909 |
| 2,142,150 | Replogle | Jan. 3, 1939 |
| 2,569,956 | Schiltknecht | Oct. 2, 1951 |
| 2,667,865 | Herman | Feb. 2, 1954 |
| 2,739,829 | Pedlow et al. | Mar. 27, 1956 |
| 2,745,368 | Klein | May 15, 1956 |
| 2,929,754 | Stark | Mar. 22, 1960 |
| 2,930,634 | Merritt | Mar. 29, 1960 |
| 2,961,363 | Lowes | Nov. 22, 1960 |